(12) United States Patent
Hu

(10) Patent No.: US 11,149,776 B2
(45) Date of Patent: Oct. 19, 2021

(54) SCREW STRUCTURE

(71) Applicant: CHEN NAN IRON WIRE CO., LTD., Kaohsiung (TW)

(72) Inventor: Ching-An Hu, Kaohsiung (TW)

(73) Assignee: Chen Nan Iron Wire Co., Ltd., Kaohsiung (TW)

( * ) Notice: Subject to any disclaimer, the term of this patent is extended or adjusted under 35 U.S.C. 154(b) by 166 days.

(21) Appl. No.: 16/671,651

(22) Filed: Nov. 1, 2019

(65) Prior Publication Data
US 2021/0102571 A1     Apr. 8, 2021

(30) Foreign Application Priority Data
Oct. 4, 2019   (TW) .................................. 108213175

(51) Int. Cl.
*F16B 25/00*     (2006.01)
*F16B 25/10*     (2006.01)

(52) U.S. Cl.
CPC .......... *F16B 25/0063* (2013.01); *F16B 25/10* (2013.01)

(58) Field of Classification Search
CPC .............. F16B 25/0042; F16B 25/0052; F16B 25/0057; F16B 25/0063; F16B 25/0068; F16B 25/0073
USPC ........................... 411/386, 387.3, 387.5, 412
See application file for complete search history.

(56) References Cited

FOREIGN PATENT DOCUMENTS

| TW | M273640 U | 8/2005 |
|----|-----------|--------|
| TW | M336353 U | 7/2008 |
| TW | I314188 B | 9/2009 |
| TW | I568939 B | 2/2017 |

*Primary Examiner* — Gary W Estremsky
(74) *Attorney, Agent, or Firm* — Rosenberg, Klein & Lee

(57) ABSTRACT

A screw structure is disclosed herein. It comprises a head; a rod body integrally extended from the head and having a flat shank part and a tapered tip at a terminal of the flat shank part; a first screw thread disposed on the rod body and having a positioning tooth at a terminal thereof, a plurality of cutting units and a plurality of shaving collection spaces; a plurality of second screw threads disposed on the rod body; and a reamer thread disposed at an upper end of the rod body.

4 Claims, 6 Drawing Sheets

SCREW STRUCTURE

BACKGROUND OF THE INVENTION

1. Field of the Invention

The present invention relates to a screw structure which can be applied to screw into various wood materials and achieves an excellent anti-loose effect.

2. Description of Related Art

Generally, the combination and positioning of two different articles primarily rely on screws. For instance, wood screws are widely used to fix or connect wood articles. A common wood screw structure comprises a head, a rod body integrally extended from the head and having a flat shank part and a tapered screwing part, and a screw thread disposed on the rod body. In this way, the wood screw can drill into articles to fasten the articles. The structural design of conventional wood screws varies depending on the intended use.

For instance, the Taiwan patent TWI568939 (B), issued on 1 Feb. 2017, has disclosed a screw. It comprises a shank including a tapered screwing portion, a head portion, and a straight portion between the screwing portion and the head portion; a first thread, and a second thread, wherein the tapered screwing portion is spaced from the head portion by a longitudinal axis of the shank; a first thread spirally formed on the shank and including an upper thread portion formed on an outer circumference of the straight portion and a lower thread portion formed on an outer circumference of the tapered screwing portion, wherein a slope of the lower thread portion relative to the longitudinal axis is less than a slope of the upper thread portion relative to the longitudinal axis; and a second thread spirally formed on the shank and extends to a lower end of the straight portion from the tapered screwing portion and including a plurality of thread convolutions spaced from the thread convolutions of the lower thread portion of the first thread. A thread pitch between two adjacent threads of the second thread is approximately equal to the thread pitches of the lower thread portion. The above screw furthermore comprises a plurality of beveling ribs and at least one of shaving collection slot so that the waste shavings generated by cutting the article can be guided through the beveling ribs and discharged from the bottom of the shaving collection slot so as to rapid insertion of the screw into the article to be fastened and reduce the resistance of the drilling. However, the shaving collection slot merely has the function of removing shavings, but it does not effectively tighten the screw, so the screw is easily loosened due to vibration after being locked.

The Taiwan patent TWI314188 (B), issued on 1 Sep. 2009, has disclosed a screw nail. It comprises a plurality of threads on the stein of screw nail installed with a plurality of slant grooves. A guide rib is sequentially installed between the slant grooves of each thread and its corresponding next groove of thread. The slant grooves are also designed to assist the guide ribs in the process of pushing scraps to smoothly discharge the scraps from the slant grooves along the threads. Although the screw nail provides the advantages of power-saving operation, rapid discharge of scraps, and stable locking, it is easily loosened due to vibration after being locked.

The Taiwan patent TWM336353 (U), issued on 11 Jul. 2008, has disclosed a screw nail. It comprises a rod body, a head at an upper end of the rod body, a tip portion at a lower end of the rod body, a plurality of screw thread disposed on an upper section of the rod body for cutting a material, a thread convolution extended upward from the tip portion for a given length and provided with a toothed cutting groove at the tip portion, and at least one oblique thread disposed at a lower section of the thread convolution and having an upward rotating direction opposite to an upward rotating direction of the thread convolution. In this way, the screw nail can be used for rapidly screwing into wooden products. However, the above screw nail is still easily released by vibration after being locked.

The Taiwan patent TWM273640 (U), issued on 21 Aug. 2005, has disclosed an improved screw structure. It comprises a head, a neck at a bottom of the head, a rod body connected to the neck, a screw thread extended from the rod body, a screw ridge, a drilling portion disposed at a lower end of the screw thread, a tapered end at a lower end of the drilling portion, at least one groove disposed on the root of the screw thread, at least one shaving discharging slot disposed on the screw ridge, at least one slit obliquely disposed on the drilling portion to form at least one drilling rib, and a guide thread obliquely disposed on the tapered end and having a start point attached to the tapered end. An outer diameter of a root of the screw thread is less than an outer diameter of the rod body, and an outer diameter of the screw ridge is larger than the outer diameter of the rod body. An outer diameter of the drilling portion is larger than the outer diameter of the root of the screw thread but less than the outer diameter of the screw ridge. Since there are one or two guide threads on the tapered end of the screw thread, the user only needs to apply the force on a tool head and the head of the screw structure to screw the improved screw structure into articles by a low point of an oblique cutting edge on the drilling rib. Therefore, it has effects of saving effort and convenience of one-hand operation.

Although the abovementioned screw structures achieve the intended effects of screwing and drilling into articles, most of their structural design focuses on the removal of shavings, so they are still easily released due to external factors after they are locked in the articles.

SUMMARY OF THE INVENTION

In view of the above-mentioned problems, the object of the present invention is to provide a screw structure which can be applied to screw into various wood materials rapidly for fixation and achieves an excellent anti-loose effect.

The screw structure of the present invention comprises a head; a rod body integrally extended from the head; a first screw thread disposed on the rod body and having a positioning tooth at a terminal thereof, a plurality of cutting units and a plurality of shaving collection spaces; a plurality of second screw threads disposed on the rod body; a reamer thread disposed at an upper end of the rod body; and a plurality of embossed teeth disposed between the first screw thread and the reamer thread. When the screw structure is screwed into an upper article and a lower article, the wood shavings can be collected in the plurality of embossed teeth and the plurality of shaving collection spaces to fasten the lower article and the upper article and achieve an excellent anti-loose effect.

DETAILED DESCRIPTION OF THE PREFERRED EMBODIMENT

Hereinafter, an exemplary embodiment of the present invention will be described in detail with reference to the accompanying drawings.

Figure 1:
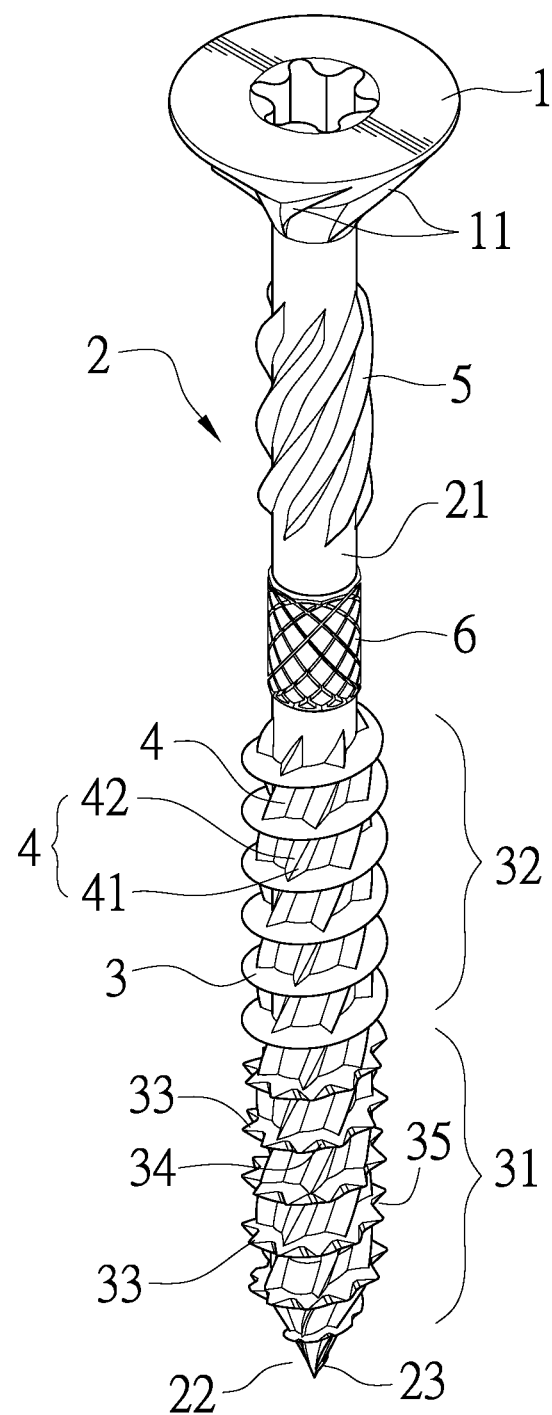
FIG. 1 is a first stereogram showing a screw structure according to the present invention.
Figure 2:
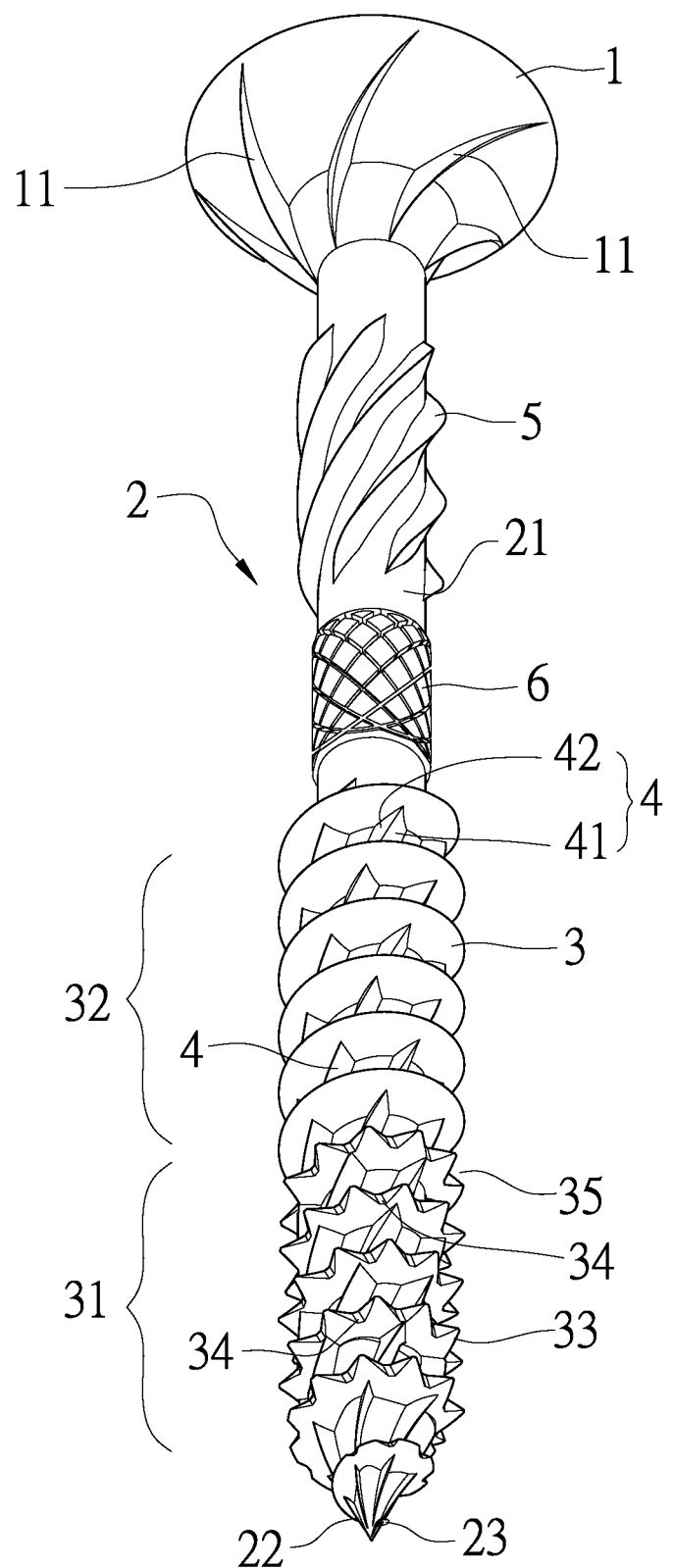
FIG. 2 is a second stereogram showing a screw structure according to the present invention.
Figure 3:
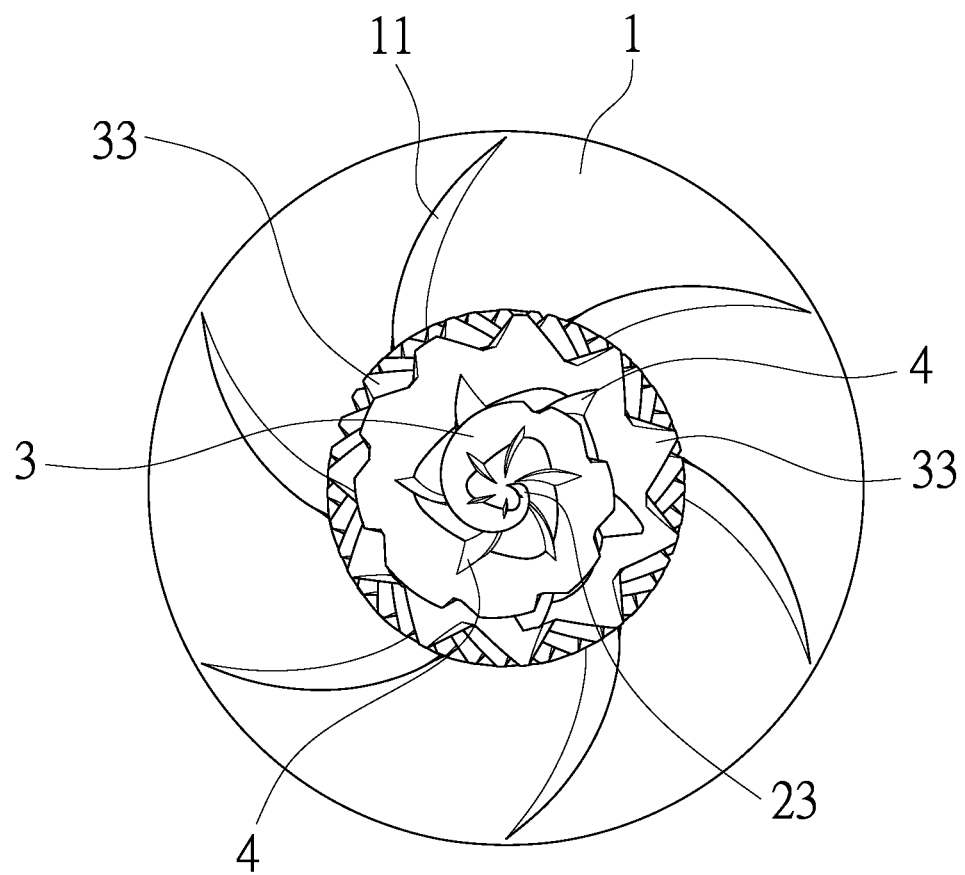
FIG. 3 is a bottom view showing a screw structure according to the present invention.
Figure 4:
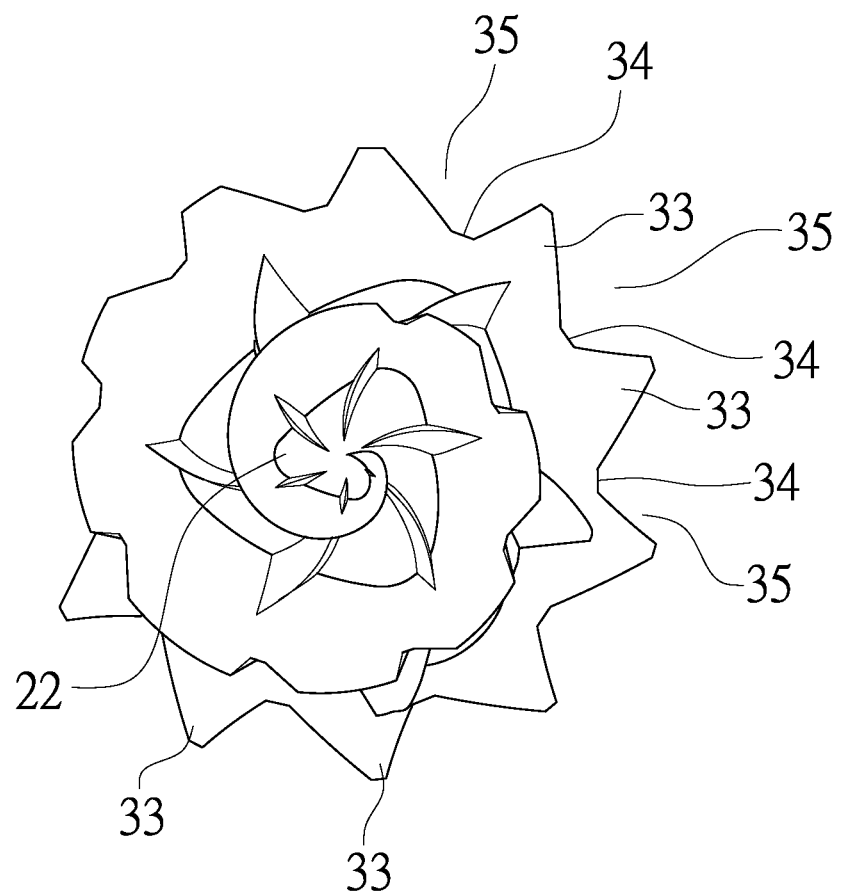
FIG. 4 is a partial enlarged view showing a plurality of shaving collection spaces according to the present invention.
Figure 5:
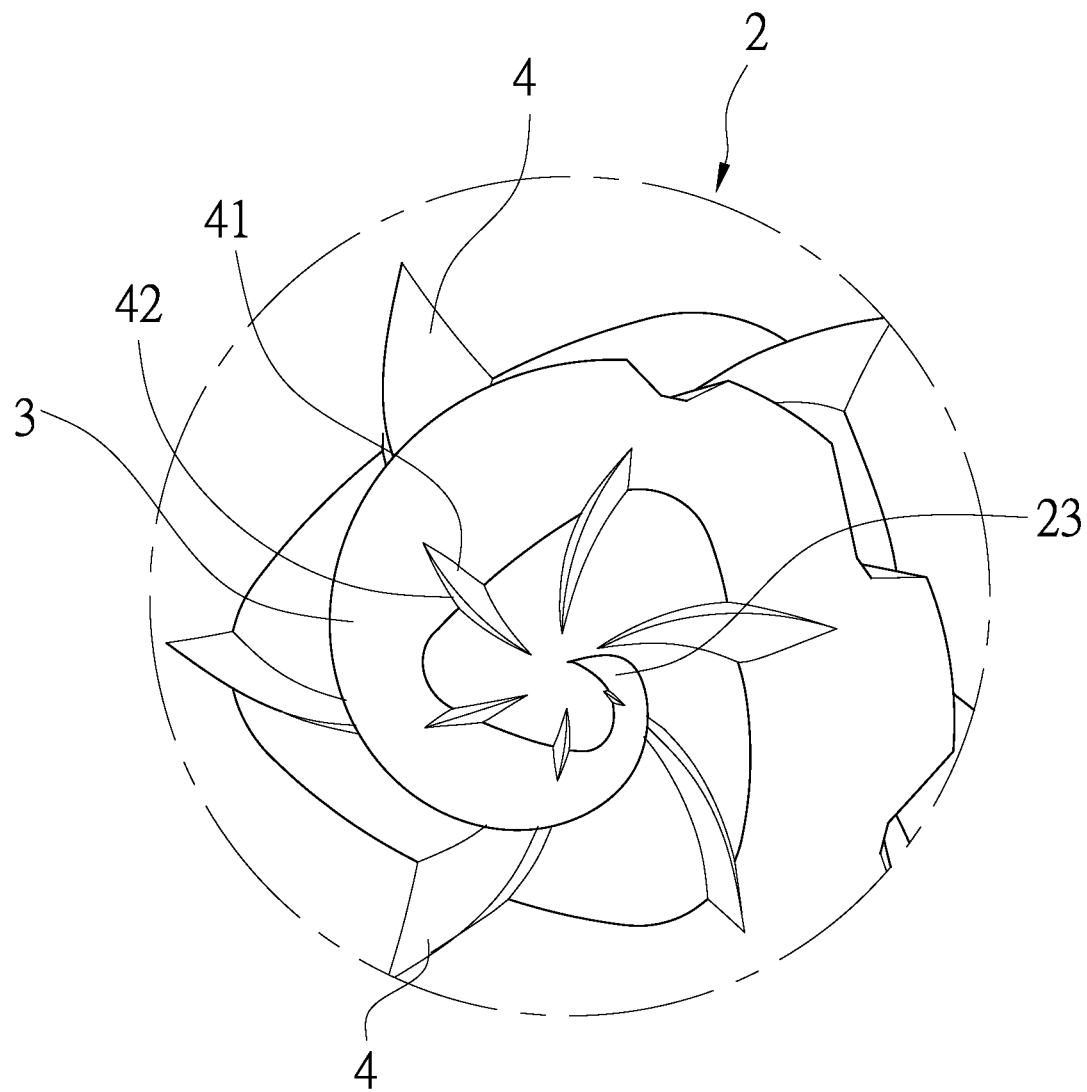
FIG. 5 is a partial enlarged view showing a plurality of second screw threads according to the present invention.
Figure 6:
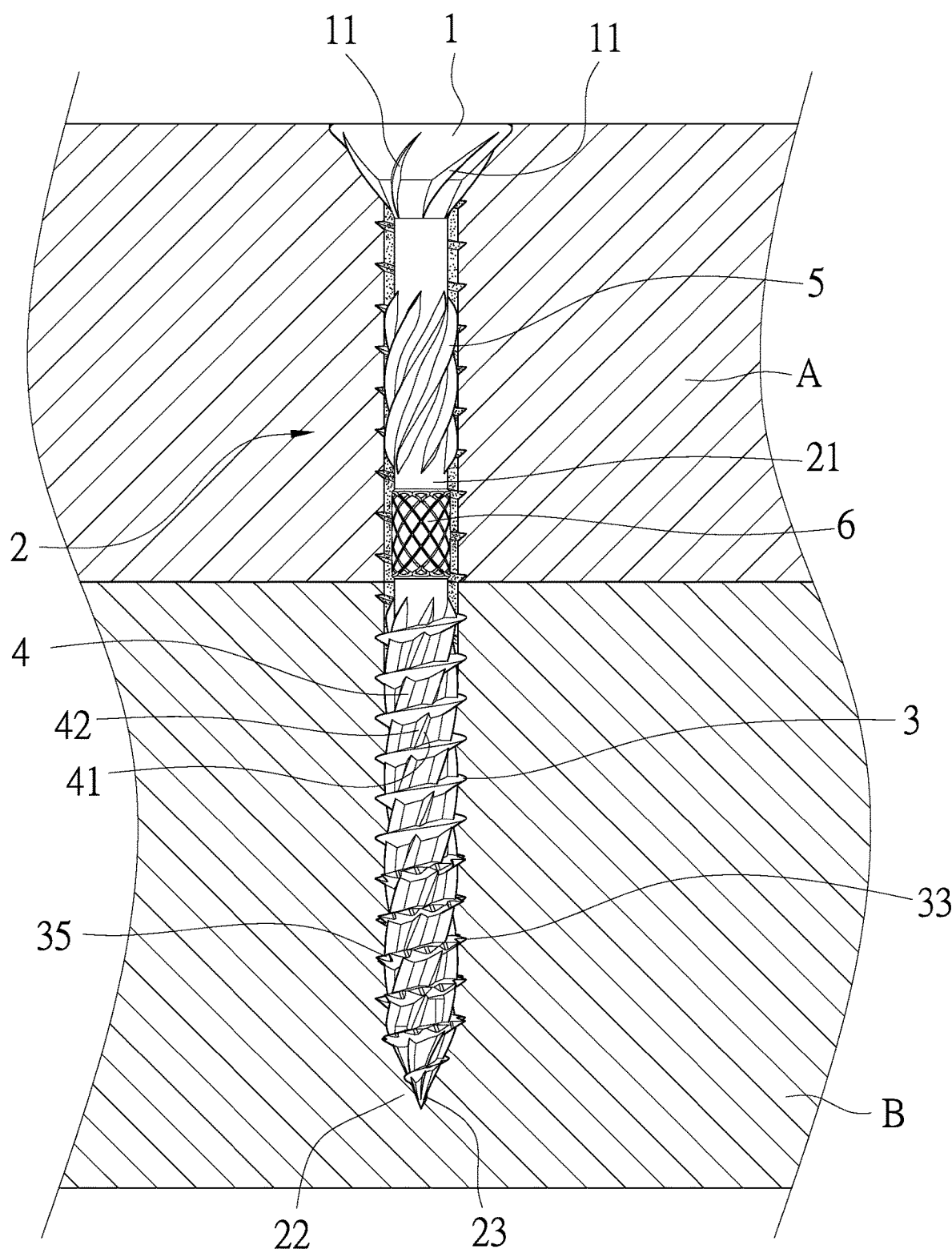
FIG. 6 is a schematic diagram showing a screw structure screwed into two articles.

As showed in FIG. 1 to FIG. 6, a screw structure according to the present invention is disclosed herein. It comprises a head (1) having a plurality of positioning threads (11) at a bottom thereof, a rod body (2) integrally extended from the head (1), a first screw thread (3) disposed on the rod body (2), a plurality of second screw threads (4) disposed on the rod body (2), a reamer thread (5) disposed at an upper end of the rod body (2), and a plurality of embossed teeth (6) disposed between the first screw thread (3) and the reamer thread (5). The rod body (2) is provided with a flat shank part (21) and a tapered tip (22) at a terminal of the flat shank part (21). The first screw thread (3) is provided with a positioning tooth (23) at a terminal thereof and divided into a lower part (31) connected to the positioning tooth (23) and an upper part (32) connected to the lower part (31). The first screw thread (3) is further provided with a plurality of cutting units (33) disposed on the lower part (31), a plurality of connecting sections (34), each disposed between every two adjacent cutting units (33), and a plurality of shaving collection spaces (35), each formed between every two adjacent cutting units (33). Each of the plurality of second screw threads (4) has a bevel cutting section (41) and an arc cutting section (42). The bevel cutting section (41) and the arc cutting section (42) define an included angle of 45 degrees.

Referring to FIG. 1 to FIG. 6, in practical use of the present invention, the screw is locked into two wood articles, e.g. an upper article (A) and a lower article (B). The screw is first screwed into the upper article (A) by the positioning tooth (23) for securing a drilling position and avoiding shift. Then, the first screw thread (3) on the tapered tip (22) cooperated with the plurality of second screw threads (4) continue to screw into the upper article (A). Preferably, there are six second screw threads (4), each of which has the bevel cutting section (41) and the arc cutting section (42). Preferably, the included angle between the bevel cutting section (41) and the arc cutting section (42) is 45 degrees. After the tapered tip (22) is screwed into the upper article (A), the plurality of cutting units (33) on the lower part (31) of the first screw thread (3) assist and enhance the drilling action, thus achieving rapid insertion of the screw into the lower article (B). Furthermore, the cut wood shavings are gathered in the plurality of shaving collection spaces (35), so the screw can tightly fasten on the lower article (B).

After the screw is screwed into the upper article (A) and the lower article (B), the plurality of embossed teeth (6) and the reamer thread (5) on the flat shank part (21) can lock the upper article (A). The plurality of embossed teeth (6) effectively retain the wood shavings to tightly fasten on the upper article (A), and the reamer thread (5) and the plurality of positioning threads (11) at the bottom of the head (1) stably lock the upper article (A). Accordingly, the reamer thread (5) and the plurality of shaving collection spaces (35) respectively lock the upper article (A) and the lower article (B), so the screw is not easily loosened due to vibration after being locked and thus achieves an excellent anti-loose effect. Additionally, the plurality of positioning threads (11) limits a screwing depth of the head (1) so that the head (1) is not sunken on a surface of the upper article (A), which keeps the surface of the upper article (A) flat and avoids the accumulation of dust in the depression on the surface.

According to the above description, in comparison with the traditional technique, the screw structure according to the present invention has the advantages as following:

1. The positioning tooth protruded from an outer of the first screw thread secures the drilling position and avoids shift, so the present invention has the effect of maintaining a stable position.

2. The bevel cutting section and the arc cutting section of the second screw threads and the cutting units on the lower part of the first screw thread assist and enhance the cutting action, thus achieving rapid insertion of the screw into the wood articles.

3. The shaving collection spaces gather and store the cut wood shavings when the screw in rapidly screwed into the lower article to tighten the lower article, so the present invention is not easily loosened due to vibration after being locked and thus achieves an excellent anti-loose effect.

4. The reamer thread and the shaving collection spaces respectively lock the upper article and the lower article, so the present invention is not easily loosened due to vibration after being locked and thus achieves an excellent anti-loose effect.

5. The positioning threads limit the locking depth of the head so that the head is not sunken on a surface of the upper article, which keeps the surface of the upper article flat and avoids the accumulation of dust in the depression on the surface.

6. The embossed teeth on the flat shank part allows the screw to rapidly drill into the upper article and retains the wood shavings to tightly fasten on the upper article, which increase the adhesion between the screw and the upper article and prevent loosening by vibration.

What is claimed is:

1. A screw structure, comprising:
   a head having a plurality of positioning threads at a bottom thereof;
   a rod body integrally extended from the head and having a flat shank part and a tapered tip at a terminal of the flat shank part;
   a first screw thread disposed on the rod body and having a positioning tooth at a terminal thereof, a lower part connected to the positioning tooth, an upper part connected to the lower part, a plurality of cutting units disposed on the lower part, a plurality of connecting sections, each disposed between every two adjacent cutting units, and a plurality of shaving collection spaces, each formed between every two adjacent cutting units;
   a plurality of second screw threads disposed on the rod body, wherein each of the plurality of second screw threads has a bevel cutting section and an arc cutting section, and wherein the bevel cutting section and the arc cutting section define an included angle;
   a reamer thread disposed at an upper end of the rod body; and a plurality of embossed teeth disposed between the first screw thread and the reamer thread.

2. The screw structure as claimed in claim 1, wherein the included angle between the bevel cutting section and the arc cutting section is 45 degrees.

3. The screw structure as claimed in claim 1, wherein the rod body is provided with six second screw threads thereon.

4. The screw structure as claimed in claim 1, wherein the head is provided with six positioning threads at the bottom thereof.

\* \* \* \* \*